United States Patent
Jung et al.

(10) Patent No.: US 12,304,983 B2
(45) Date of Patent: May 20, 2025

(54) ACRYLIC COPOLYMER, METHOD FOR MANUFACTURING SAME, AND ACRYLIC COPOLYMER COMPOSITION COMPRISING SAME

(71) Applicant: LG Chem, Ltd., Seoul (KR)

(72) Inventors: Yong Seok Jung, Daejeon (KR); Jung Su Han, Daejeon (KR); Ji Young Lee, Daejeon (KR); Seung Uk Yeu, Daejeon (KR); Sang Jin Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 232 days.

(21) Appl. No.: 17/311,891

(22) PCT Filed: Aug. 21, 2020

(86) PCT No.: PCT/KR2020/011183
§ 371 (c)(1),
(2) Date: Jun. 8, 2021

(87) PCT Pub. No.: WO2021/071085
PCT Pub. Date: Apr. 15, 2021

(65) Prior Publication Data
US 2022/0025086 A1   Jan. 27, 2022

(30) Foreign Application Priority Data

Oct. 11, 2019  (KR) .................. 10-2019-0125869
Jul. 29, 2020  (KR) .................. 10-2020-0094657

(51) Int. Cl.
| | | |
|---|---|---|
| C08F 220/18 | (2006.01) | |
| C08F 212/14 | (2006.01) | |
| C08F 212/36 | (2006.01) | |
| C08F 220/22 | (2006.01) | |
| C08F 220/28 | (2006.01) | |
| C08F 222/10 | (2006.01) | |
| C08K 3/04 | (2006.01) | |

(52) U.S. Cl.
CPC .......... *C08F 212/36* (2013.01); *C08F 212/18* (2020.02); *C08F 220/1802* (2020.02); *C08F 220/1804* (2020.02); *C08F 220/22* (2013.01); *C08F 220/281* (2020.02); *C08F 222/102* (2020.02); *C08K 3/04* (2013.01)

(58) Field of Classification Search
CPC .......... C08F 220/1802; C08F 220/1804; C08F 220/281; C08F 220/26; C08F 220/22; C08F 212/18; C08F 222/102; C08L 33/16
See application file for complete search history.

(56) References Cited

U.S. PATENT DOCUMENTS

2015/0073074 A1   3/2015 Naitou et al.
2018/0030216 A1*  2/2018 Emori .................. C08J 3/24
2018/0327517 A1  11/2018 Mosaki

FOREIGN PATENT DOCUMENTS

| CN | 109952327 A    | 6/2019   |
|----|----------------|----------|
| EP | 3549962 A1     | 10/2019  |
| JP | 05262831 A  *  | 10/1993  |
| JP | H05262831 A    | 10/1993  |
| JP | H0615635 B2    | 3/1994   |
| JP | H0739526 B2    | 5/1995   |
| JP | 2005120143 A   | 5/2005   |
| JP | 201530760 A    | 2/2015   |
| JP | 201593926 A    | 5/2015   |
| KR | 20140147823 A  | 12/2014  |
| KR | 20180015797 A  | 2/2018   |
| KR | 20180084831 A  | 7/2018   |
| KR | 20190085931 A  | 7/2019   |
| WO | 2016136697 A1  | 9/2016   |

OTHER PUBLICATIONS

Machine translation into English of JP 62-053352; Toyoshima et al (Year: 1993).*
Partial translation into English of JP 62-053352; Toyoshima et al (Year: 1993).*
International Search Report for PCT/KR2020/011183 mailed Nov. 26, 2020; 3 pages.

* cited by examiner

*Primary Examiner* — Karuna P Reddy
(74) *Attorney, Agent, or Firm* — Lerner David LLP

(57) ABSTRACT

Provided is an acryl-based copolymer, and more particularly, an acryl-based copolymer including a main monomer-derived repeating unit and a polyfunctional monomer-derived moiety, wherein the main monomer-derived repeating unit includes a (meth)acrylic acid alkyl ester monomer-derived repeating unit, a (meth)acrylic acid alkoxy alkyl ester monomer-derived repeating unit, and a crosslinkable monomer-derived repeating unit, the polyfunctional monomer includes a vinyl group or an allyl group, and the polyfunctional monomer-derived moiety is included in an amount of 0.0005 to 1 part by weight based on 100 parts by weight of the total main monomer-derived repeating unit.

4 Claims, No Drawings

ACRYLIC COPOLYMER, METHOD FOR MANUFACTURING SAME, AND ACRYLIC COPOLYMER COMPOSITION COMPRISING SAME

CROSS-REFERENCE TO RELATED APPLICATIONS

The present application is a national phase entry under 35 U.S.C. § 371 of International Application No. PCT/KR2020/011183, filed on Aug. 21, 2020, which claims priority to Korean Patent Application No. 10-2019-0125869, filed on Oct. 11, 2019, and Korean Patent Application No. 10-2020-0094657, filed on Jul. 29, 2020, the entire contents of which are incorporated herein by reference.

TECHNICAL FIELD

The present invention relates to an acryl-based copolymer, and more particularly, to an acryl-based copolymer having an excellent oil resistance and a small compression set, a method of preparing the same, and an acryl-based copolymer composition comprising the same.

BACKGROUND ART

Acrylic rubber is a polymer whose main component is an acrylic acid ester, is known to have excellent heat resistance, oil resistance, and ozone resistance, and is widely used as a part material for a seal, a hose, a tube, and a belt, etc. in vehicle-related fields, etc. The acrylic rubber is used in a small amount, but is mainly used for an important part that determines performance of a vehicle. Due to the properties of the acrylic rubber, the acrylic rubber has been used as an important part for a portion where vibration and noise occurs and a portion where a heat resistance and an oil resistance are required.

The acrylic rubber needs to be crosslinked to have elasticity, and needs to have excellent heat resistance and oil resistance under a high temperature, in order to be used as a material of a rubber part. Recently, performance improvement of the rubber part has been demanded because a thermal environmental condition around an internal combustion engine is severe due to an increase in an output or exhaust gas, etc. of the internal combustion engine, and engine oil is operated under a high-temperature condition.

The crosslinkable acrylic rubber, which has been used for various purposes as described above, requires excellent oil resistance and a certain level of elasticity which is a rubber property. In addition, in order to implement durability suitable for the above-mentioned use, the acrylic rubber requires high crosslinking density.

DISCLOSURE

Technical Problem

An object of the present invention is to provide an acryl-based copolymer composition having an excellent oil resistance and a small compression set.

Technical Solution

In one general aspect, there is provided an acryl-based copolymer including a main monomer-derived repeating unit and a polyfunctional monomer-derived moiety, wherein the main monomer-derived repeating unit includes a (meth) acrylic acid alkyl ester monomer-derived repeating unit, a (meth)acrylic acid alkoxy alkyl ester monomer-derived repeating unit, and a crosslinkable monomer-derived repeating unit, the polyfunctional monomer includes a vinyl group or an allyl group, and the polyfunctional monomer-derived moiety is included in an amount of 0.0005 to 1 part by weight based on 100 parts by weight of the total main monomer-derived repeating unit.

In another general aspect, there is provided a method of producing an acryl-based copolymer including: preparing a main monomer mixture including a (meth) acrylic acid alkyl ester monomer, a (meth) acrylic acid alkoxy alkyl ester monomer, and a crosslinkable monomer; and adding a polyfunctional monomer to the main monomer mixture and polymerizing the mixture, wherein the polyfunctional monomer is added in an amount of 0.0005 to 1 part by weight based on 100 parts by weight of the total main monomer mixture.

Advantageous Effects

An acryl-based copolymer including a polyfunctional monomer according to the present invention may improve crosslinking density of the polymer to have excellent oil resistance and maintain elasticity, which is characteristic of rubber, thereby reducing compression set.

BEST MODE

The terms and words used in the detailed description and claims of the invention should not be interpreted as being limited to conventional or dictionary meanings, but should be interpreted as having meanings and concepts meeting the technical ideas of the present invention based on a principle that the inventors can appropriately define the concepts of terms in order to describe their own inventions in the best mode.

The terms "~derived repeating unit" and "derived moiety" used herein may refer to a component, a structure, or a material itself resulting from certain materials. As a specific example, the term "~derived repeating unit" may refer to a repeating unit in which the added monomer participates in a polymerization reaction and is formed in the polymer, during the polymerization of the polymer, and the term "derived moiety" may refer to inducing a chain transfer reaction of the polymer by participating in the polymerization reaction of the added chain transfer agent, during the polymerization of the polymer.

The term "rubber" used herein may refer to a plastic material having elasticity, and may refer to rubber, elastomer, or synthetic latex, etc.

The term "copolymer" used herein may refer to all copolymers formed by copolymerization of a comonomer, and as a specific example, may refer to both a random copolymer and a block copolymer.

Hereinafter, the present invention will be described in more detail to assist in understanding the technical idea of the present invention.

An acryl-based copolymer according to the present invention may include a main monomer-derived repeating unit and a polyfunctional monomer-derived moiety.

According to an exemplary embodiment of the present invention, the main monomer-derived repeating unit may include a (meth)acrylic acid alkyl ester monomer-derived repeating unit, a (meth)acrylic acid alkoxy alkyl ester monomer-derived repeating unit, and a crosslinkable monomer-derived repeating unit.

According to an exemplary embodiment of the present invention, the (meth)acrylic acid alkyl ester monomer-derived repeating unit serves to increase a workability, a heat resistance and a cold resistance in a final product by adjusting a glass transition temperature in the acryl-based copolymer, and may be a (meth)acrylic acid alkyl ester monomer containing an alkyl group having 1 to 8 carbon atoms. In this case, the alkyl group having 1 to 8 carbon atoms may refer to a linear or cyclic alkyl group having 1 to 8 carbon atoms. A specific example of the (meth)acrylic acid alkyl ester monomer may include methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, cyclohexyl (meth)acrylate, etc. Here, the (meth)acrylic acid alkyl ester monomer may be used alone or in combination of two or more of those mentioned above, and specific examples thereof may include ethyl (meth)acrylate, n-butyl (meth)acrylate monomer, etc.

A content of the (meth)acrylic acid alkyl ester monomer-derived repeating unit in the main monomer-derived repeating unit may be 60 wt. % to 95 wt. %, 75 wt. % to 93 wt. %, or 80 wt. % to 90 wt. %. In this range, the acryl-based copolymer according to the present invention may have excellent workability, heat resistance, and cold resistance.

The (meth)acrylic acid alkoxy alkyl ester monomer-derived repeating unit serves to increase workability, heat resistance and cold resistance in a final product by adjusting a glass transition temperature in the acryl-based copolymer, and may refer to a (meth)acrylic acid alkyl ester monomer containing an alkoxyalkyl group having 1 to 8 carbon atoms. A specific example of the (meth)acrylic acid alkoxy alkyl ester monomer may include methoxymethyl (meth)acrylate, ethoxyethyl (meth)acrylate, 2-ethoxyethyl (meth)acrylate, 2-butoxyethyl (meth)acrylate, 2-methoxyethyl (meth)acrylate, 2-propoxyethyl (meth)acrylate, 3-methoxypropyl (meth)acrylate, 4-methoxybutyl (meth)acrylate, etc. A specific example of the (meth)acrylic acid alkoxy alkyl ester monomer may include 2-methoxyethyl (meth)acrylate.

A content of the (meth)acrylic acid alkoxy alkyl ester monomer-derived repeating unit in the main monomer-derived repeating unit may be 1 wt. % to 35 wt. %, 7 wt. % to 25 wt. %, or 10 wt. % to 20 wt. %. In this range, the acryl-based copolymer according to the present invention may have excellent workability and oil resistance.

Meanwhile, the total content of the (meth)acrylic acid alkyl ester monomer-derived repeating unit and the (meth)acrylic acid alkoxy alkyl ester monomer-derived repeating unit included in the main monomer-derived repeating unit according to the present invention may be 80 wt. % to 99.9 wt. %, 85 wt. % to 99.9 wt. %, or 90 wt. % to 99.5 wt. %. In this range, the acryl-based copolymer according to the present invention may have excellent workability, cold resistance, and heat resistance.

The crosslinkable monomer-derived repeating unit is a component for imparting a crosslinkable functional group in the acryl-based copolymer, and may be at least one selected from the group consisting of a butenedionic acid monoester monomer, an epoxy group-containing monomer, and a halogen-containing monomer.

The butenedionic acid monoester monomer may be a maleic acid monoester monomer or a fumaric acid monoester monomer obtained by reacting an alcohol with a carboxyl group of butenedionic acid, that is maleic acid or fumaric acid. The maleic acid monoester monomer may be a maleic acid monoalkyl ester monomer such as monomethyl maleate, monoethyl maleate, monopropyl maleate, monobutyl maleate, monopentyl maleate, and monodecyl maleate; a maleic acid monocycloalkyl ester monomer such as monocyclopentyl maleate, monocyclohexyl maleate, monocycloheptyl maleate, monocyclooctyl maleate, monomethyl cyclohexyl maleate, mono-3,5-dimethylcyclohexyl maleate, monodicyclopentanyl maleate, and monoisobornyl maleate; and a maleic acid monocycloalkenyl ester monomer such as monocyclopentenyl maleate, monocyclohexenyl maleate, monocycloheptenyl maleate, monocyclooctenyl maleate, and dicyclopentadienyl maleate. The fumaric acid monoester monomer may be a fumaric acid monoalkyl ester monomer such as monomethyl fumarate, monoethyl fumarate, monopropyl fumate, monobutyl fumarate, monohexyl fumarate, and monooctyl fumarate; a fumaric acid monocycloalkyl ester monomer such as monocyclopentyl fumarate, monocyclohexyl fumarate, monocycloheptyl fumarate, monocyclooctyl fumarate, monomethyl cyclohexyl fumarate, mono-3,5-dimethylcyclohexyl fumarate, dicyclopentanyl fumarate, and isobonyl fumarate; and a fumaric acid monocycloalkenyl ester monomer such as monocyclopentenyl fumarate, monocyclohexenyl fumarate, monocycloheptenyl fumarate, monocyclooctenyl fumarate, and monodicyclopentadienyl fumarate.

The epoxy group-containing monomer may be glycidyl (meth)acrylate, vinyl glycidyl ether, allyl glycidyl ether, methacryl glycidyl ether, etc. A specific example of the epoxy group-containing monomer may include glycidyl (meth)acrylate, allyl glycidyl ether, etc.

The halogen-containing monomer may be vinyl chloroacetate, vinyl bromo acetate, allyl chloro acetate, vinyl chloro propionate, vinyl chloro butyrate, vinyl bromo butyrate, 2-chloro ethyl acrylate, 3-chloro propylacrylate, 4-chlorobutyl acrylate, 2-chloro ethyl methacrylate, 2-bromo ethyl acrylate, 2-iodine ethyl acrylate, 2-chloroethyl vinyl ether, chloro methyl vinyl ether, 4-chloro-2-butenyl acrylate, vinyl benzyl chloride, 5-chloromethyl-2-norbornene, 5-chloroacetoxy methyl-2-norbornene, etc. A specific example of the halogen-containing monomer may include vinyl chloroacetate, vinyl benzyl chloride, 2-chloro ethyl acrylate, 2-chloroethyl vinyl ether, etc.

A content of the crosslinkable monomer-derived repeating unit in the main monomer-derived repeating unit may be 0.1 wt. % to 20 wt. %, 0.1 wt. % to 15 wt. %, or 0.5 wt. % to 10 wt. %. In this range, the acryl-based copolymer according to the present invention may have a high crosslinking density and an excellent mechanical property, an elongation of the obtained crosslinked product may be improved, and compression set may be prevented.

The main monomer-derived repeating unit may further include other monomer-derived repeat units capable of polymerizing with the (meth)acrylic acid alkyl ester monomer-derived repeating unit and the (meth)acrylic acid alkoxy alkyl ester monomer-derived repeating unit in addition to the (meth)acrylic acid alkyl ester monomer-derived repeating unit, the (meth)acrylic acid alkoxy alkyl ester monomer-derived repeating unit, and the crosslinkable monomer-derived repeating unit.

The polyfunctional monomer-derived moiety is a component that induces crosslinking between monomers to increase the crosslinking density of the polymer when the acryl-based copolymer is prepared, and may be derived from a crosslinking agent containing two or more vinyl groups and allyl groups. Specific examples of the polyfunctional monomer may include an ally compound such as divinylbenzene, 1,4-divinyloxybutane, divinyl sulfone, diallyl phthalate, diallyl acrylamide, triallyl (iso)cyanurate, and triallyl trimellitate, hexanediol diacrylate, ethylene glycol dimethacrylate, diethylene glycol methacrylate, triethylene glycol dimethacrylate, trimethylenepropane trimethacrylate, 1,3-butanediol methacrylate, 1,6-hexanediol dimethacrylate, pentaerythritol tetra(meth)acrylate, pentaerythritol tri(meth) acrylate, pentaerythritol di(meth)acrylate, trimethylolpropane tri(meth)acrylate, dipentaerythritol hexa(meth)acrylate, dipentaerythritol penta(meth)acrylate, glycerol tri (meth)acrylate, allyl (meth)acrylate, etc. In the present invention, the polyfunctional monomer may be used alone or in combination of two or more of those mentioned above. A specific example of the polyfunctional monomer may include divinylbenzene or allyl methacrylate.

A content of the polyfunctional monomer-derived moiety may be 0.0005 parts by weight to 1.0 part by weight, 0.001 parts by weight to 0.8 parts by weight, or 0.001 parts by weight to 0.05 parts by weight based on 100 parts by weight of the main monomer-derived repeating unit. In this range, the crosslinking density of the acryl-based copolymer according to the present invention may be improved, and thus the oil resistance is increased and the compression set is decreased, while the acryl-based copolymer may be prevented from being excessively hard, and thus also have excellent workability and processability.

The acryl-based copolymer may have a weight average molecular weight of 200,000 g/mol to 4,000,000 g/mol, 300,000 g/mol to 3,000,000 g/mol, or 500,000 g/mol to 2,500,000 g/mol. In this range, it is possible to reduce the preparation time of the acryl-based copolymer and to implement an excellent mechanical property.

The acryl-based copolymer may have a Mooney viscosity (ML1+4, 100° C.) of 10 to 70, 20 to 60, or 25 to 50, and may have excellent workability within this range.

According to the present invention, there is provided a method of preparing an acryl-based copolymer. The method of preparing an acryl-based copolymer according to the present invention may include preparing a main monomer mixture including a (meth)acrylic acid alkyl ester monomer, a (meth)acrylic acid alkoxy alkyl ester monomer, and a crosslinkable monomer; and adding 0.0005 parts by weight to 1 part by weight of a polyfunctional monomer to the main monomer mixture based on 100 parts by weight of the total main monomer mixture and polymerizing the mixture. Here, the polyfunctional monomer may include a crosslinking agent containing two or more vinyl groups and allyl groups.

A content of the polyfunctional monomer may be 0.0005 parts by weight to 1.0 part by weight, 0.001 parts by weight to 0.8 parts by weight, or 0.001 parts by weight to 0.05 parts by weight based on 100 parts by weight of the total main monomer mixture. In this range, the crosslinking density of the acryl-based copolymer according to the present invention may be improved, and thus the oil resistance is increased and the compression set is decreased, while the acryl-based copolymer may be prevented from being excessively hard, and thus also have excellent workability and processability.

The preparing of the main monomer mixture may be a step of blending a monomer forming the main chain of the acryl-based copolymer. The type and content of the monomer forming the main monomer mixture may be the same as those of the monomer for forming the main monomer-derived repeating unit as described above.

The preparation of the acryl-based copolymer may be performed using methods such as emulsion polymerization, bulk polymerization, suspension polymerization, and solution polymerization, and may be performed using an emulsion polymerization method such as a batch type, a semi-batch type, or a continuous type by additionally using an additive such as an initiator, an emulsifier, a polymerization terminator, an ion exchange water, a molecular weight regulator, an activator, and a redox catalyst.

The initiator may include, for example, an inorganic peroxide such as sodium persulfate, potassium persulfate, ammonium persulfate, potassium perphosphate, and hydrogen peroxide; an organic peroxide such as diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, benzoyl peroxide, 3,5,5-trimethylhexanol peroxide, and t-butyl peroxy isobutyrate; and a nitrogen compound such as azobis isobutyronitrile, azobis-2,4-dimethylvaleronitrile, azobiscyclohexanecarbonitrile, and azobis methyl isobutyrate. These polymerization initiators may be used alone or in combination of two or more of those mentioned above. Such initiators may be used in an amount of 0.005 parts by weight to 0.2 parts by weight based on the 100 parts by weight of the main monomer mixture.

Meanwhile, the organic or inorganic peroxide initiator may be combined with a reducing agent and used as a redox polymerization initiator The reducing agent is not particularly limited, but may be a metal ion-containing compound in a reduced state such as ferrous sulfate and cuprous naphthenate; a sulfonic acid compound such as sodium methanesulfonate; and an amine compound such as dimethylaniline. These reducing agents may be used alone or in combination of two or more of those mentioned above. The reducing agent may be used in an amount of 0.005 parts by weight to 20 parts by weight based on the 1 part by weight of the peroxide.

The emulsifier may be at least one selected from the group consisting of an anion-based emulsifier, a cation-based emulsifier, and a nonion-based emulsifier. A specific example of the emulsifier may include a nonionic emulsifier such as polyoxyethylene alkyl ether, polyoxyethylene alkylphenol ether, polyoxyethylene alkyl ester, and polyoxyethylene sorbitan alkyl ester; an anionic emulsifier, for example, a salt of fatty acid such as myristic acid, palmitic acid, oleic acid, and linolenic acid, an alkyl benzene sulfonate such as sodium dodecyl benzene sulfonate, higher alcohol sulfate ester salt, and alkyl sulfosuccinate; a cationic emulsifier such as alkyl trimethyl ammonium chloride, dialkylammonium chloride, and benzyl ammonium chloride; and a copolymerizable emulsifier such as a sulfo ester of $\alpha,\beta$-unsaturated carboxylic acids, a sulfate ester of $\alpha,\beta$-unsaturated carboxylic acid, and sulfo alkyl aryl ether. Among them, the anionic emulsifier may be suitable. The emulsifier may be used in an amount of 0.1 parts by weight to 10 parts by weight based on the 100 parts by weight of the main monomer mixture.

Water may be used as the ion exchange water, and the ion exchange water may be used in an amount of 100 parts by weight to 400 parts by weight based on 100 parts by weight of the main monomer mixture.

The molecular weight regulator may include, for example, mercaptans such as a-methylstyrene dimer, t-dodecyl mercaptan, n-dodecyl mercaptan, and octyl mercaptan; a halogenated hydrocarbon such as carbon tetrachloride, methylene chloride, and methylene bromide; and a sulfur-containing compound such as tetraethyl thiuram disulfide, dipentamethylene thiuram disulfide, and diisopropylxanthogen disulfide. The molecular weight regulator may be used in an amount of 0.1 parts by weight to 3 parts by weight based on the 100 parts by weight of the main monomer mixture.

The activator may include, for example, at least one selected from the group consisting of sodium hydrosulfite, sodium formaldehyde sulfoxylate, sodium ethylenediamine tetraacetate, ferrous sulfate, lactose, dextrose, sodium linoleate, and sodium sulfate. The activator may be used in an amount of 0.01 parts by weight to 0.15 parts by weight based on the 100 parts by weight of the main monomer mixture.

The redox catalyst may include, for example, sodium formaldehyde sulfoxylate, ferrous sulfate, disodium ethylenediamine tetraacetate, cupric sulfate, etc. The redox catalyst may be used in an amount of 0.01 parts by weight to 0.1 parts by weight based on the 100 parts by weight of the main monomer mixture.

The acryl-based copolymer composition according to the present invention may comprise the acryl-based copolymer obtained as described above and a filler.

The filler may be carbon black, silica, kaolin clay, talc, diatomaceous earth, etc.

A content of the filler may be 20 parts by weight to parts by weight, 30 parts by weight to 65 parts by weight, or 45 parts by weight to 55 parts by weight based on 100 parts by weight of the acryl-based copolymer. In this range, the acryl-based copolymer may have excellent workability and mechanical property.

Meanwhile, the acryl-based copolymer composition according to the present invention may further comprise sulfur in order to enhance the effect of blending and crosslinking.

In addition, the acryl-based copolymer composition may optionally further comprise a crosslinking agent and a crosslinking accelerator. The crosslinking agent may be an amine compound, for example, a polyvalent amine compound.

A specific example of the polyvalent amine compound may include an aliphatic polyvalent amine crosslinking agent, an aromatic polyvalent amine crosslinking agent, etc.

Examples of the aliphatic polyvalent amine crosslinking agent may include hexamethylenediamine, hexamethylenediamine carbamate, N,N'-dicinnamylidene-1,6-hexanediamine, etc.

Examples of the aromatic polyvalent amine crosslinking agent may include 4,4'-methylene dianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis [4-(4-aminophenoxy) phenyl] propane, 4,4'-diaminobenzanilide, 4,4'-bis (4-aminophenoxy) biphenyl, m-xylene diamine, p-xylene diamine, 1,3,5-benzene triamine, 1,3,5-benzene triaminomethyl, etc.

A content of the crosslinking agent may be 0.05 parts by weight to 20 parts by weight, 0.1 parts by weight to 10 parts by weight, or 0.3 parts by weight to 6 parts by weight based on 100 parts by weight of the acryl-based copolymer. In this range, it is easy to maintain the formed crosslinked product and elasticity may be excellent.

The crosslinking accelerator may be used in combination with the polyvalent amine crosslinking agent, and may have a base dissociation constant of 10 to 106, or to 106 at 25° C. in water. A specific example of the crosslinking accelerator may include a guanidine compound, an imidazole compound, a quaternary onium salt, a tertiary phosphine compound, an alkali metal salt of weak acid, etc. Examples of the guanidine compound may include 1,3-diphenyl guanidine, di-o-tolyl guanidine, etc. Examples of the imidazole compound may include 2-methylimidazole, 2-phenylimidazole, etc. Examples of the quaternary onium salt may include tetra n-butyl ammonium bromide, octadecyl tri n-butyl ammonium bromide, etc.

Examples of the polyvalent tertiary amine compound may include triethylene diamine, 1,8-diaza-bicyclo[5.4.0]undecene-7, etc. Examples of the tertiary phosphine compound may include triphenyl phosphine, tri p-tolylphosphine, etc. Examples of the alkali metal salt of the weak acid may include an inorganic weak acid salt such as sodium or potassium phosphate and carbonate, or an organic weak acid salt such as stearate and laurylate.

A content of the crosslinking accelerator may be 0.1 parts by weight to 20 parts by weight, 0.2 parts by weight to 15 parts by weight, or 0.3 parts by weight to 10 parts by weight based on 100 parts by weight of the acryl-based copolymer. In this range, a crosslinking rate may be properly maintained, and the crosslinked product may have excellent tensile strength.

The acryl-based copolymer composition according to the present invention may further comprise additives such as a reinforcing agent, an anti-aging agent, a light stabilizer, a plasticizer, a lubricant, an adhesive, a flame retardant, an anti-fungus agent, an antistatic agent, a coloring agent, if necessary.

The blending of the acryl-based copolymer composition according to the present invention may be performed by a suitable mixing method such as roll mixing, Banbury mixing, screw mixing, and solution mixing. A specific example thereof may be a roll mixing method. The order of blending is not particularly limited. However, after sufficiently mixing a component that is difficult to react or decompose with heat, as a component that is easy to react or decompose with heat, for example, a crosslinking agent, etc. is preferably mixed in a short time at a temperature at which no reaction or decomposition occurs. When the acryl-based copolymer composition according to the present invention is kneaded with a roll, the composition may have a small degree of adhesion of rubber to the roll, and may have excellent workability.

In addition, the molding of the acryl-based copolymer composition according to the present invention may be performed by compression molding, injection molding, transfer molding, or extrusion molding, etc. In addition, a crosslinking method may be selected depending on a shape of the crosslinked product, and may be performed by a method of simultaneously performing molding and crosslinking, a method of crosslinking after molding, etc. The acryl-based copolymer composition according to the present invention uses an acryl-based copolymer having the above configuration. Thus, flowability of the acryl-based copolymer may be excellent during molding, the degree of bubble generation may be low during molding, and the obtained molded body may have high mold precision.

The acryl-based copolymer composition according to the present invention may be prepared as a crosslinked product by heating. When the acryl-based copolymer according to the present invention is crosslinked, the obtained acryl-based copolymer may be formed into a desired shape through a molding or extrusion process, or simultaneously or subsequently cured to manufacture an article.

In addition, the manufactured article may be used as various vehicle parts such as engine mount rubber, a transmission seal, a crankshaft seal, etc.

Hereinafter, the present invention will be described in detail with reference to the following examples. However, the following examples are intended to be purely exemplary of the invention. It is apparent to those skilled in the art that various changes and modifications can be made within the scope and spirit of the present invention and that the present invention is not limited thereto.

EXAMPLES

Example 1

<Preparation of Acryl-Based Copolymer>

A main monomer mixture consisting of 32.0 wt. % of butyl acrylate, 50.0 wt. % of ethyl acrylate, 15.0 wt. % of 2-methoxy ethylacrylate, and 3.0 wt. % of vinyl chloro acetate, and based on the 100 parts by weight of the main monomer mixture, 3.0 parts by weight of sodium lauryl sulfate, 0.5 parts by weight of sodium metabisulfite, 0.01 parts by weight of cumene hydroperoxide, 0.01 parts by weight of sodium formaldehyde sulfoxylate, 0.001 parts by weight of divinylbezene (DVB), and 400 parts by weight of water were added to a polymerization reactor. Thereafter, the polymerization was initiated at a temperature of 40° C.

When polymerization conversion rate reached 93%, 0.3 parts by weigh of a polymerization terminator was added to the reactor to stop the polymerization. Thereafter, an antioxidant was added to the reactor and the resulting mixture was agglomerated in an aqueous phase to which a coagulant was added at a temperature of 65° C. to obtain a polymerized acrylic copolymer.

<Preparation of Acryl-Based Copolymer Composition>

After stirring 100 parts by weight of the acrylic copolymer at 50° C. for 30 seconds at 30 rpm through a Haake mixer, 50 parts by weight of carbon black, 1.0 part by weight of stearic acid, 2.0 parts by weight of an antioxidant, 0.3 parts by weight of sulfur, 0.3 parts by weight of potassium soap, and 2.5 parts by weight of sodium soap were added thereto, blended for 360 seconds at 90° C. to obtain an acryl-based copolymer composition blended through a roll-mill equipment.

Example 2

Example 2 was performed in the same manner as that in Example 1, except that when the acryl-based copolymer was prepared, 0.001 parts by weight of allyl methacrylate (AMA) was added instead of 0.001 parts by weight of divinylbenzene (DVB).

Example 3

Example 3 was performed in the same manner as that in Example 1, except that when the acryl-based copolymer was prepared, 0.005 parts by weight of divinylbenzene (DVB) was added instead of 0.001 parts by weight.

Example 4

Example 4 was performed in the same manner as that in Example 1, except that when the acryl-based copolymer was prepared, 0.01 parts by weight of divinylbenzene (DVB) was added instead of 0.001 parts by weight.

Example 5

Example 5 was performed in the same manner as that in Example 2, except that 0.05 parts by weight of allyl methacrylate (AMA) was added instead of 0.001 parts by weight.

Example 6

Example 6 was performed in the same manner as that in Example 2, except that 0.1 parts by weight of allyl methacrylate (AMA) was added instead of 0.001 parts by weight.

Example 7

Example 7 was performed in the same manner as that in Example 1, except that when the acryl-based copolymer was prepared, 0.06 parts by weight of divinylbenzene (DVB) was added instead of 0.001 parts by weight.

Example 8

Example 8 was performed in the same manner as that in Example 1, except that when the acryl-based copolymer was prepared, 1.0 parts by weight of divinylbenzene (DVB) was added instead of 0.001 parts by weight.

Comparative Example 1

Comparative Example 1 was performed in the same manner as that in Example 1, except that when the acryl-based copolymer was prepared, divinylbenzene (DVB) was not added.

Comparative Example 2

Comparative Example 2 was performed in the same manner as that in Example 1, except that when the acryl-based copolymer was prepared, 0.0001 parts by weight of divinylbenzene (DVB) was added instead of 0.001 parts by weight.

Comparative Example 3

Comparative Example 3 was performed in the same manner as that in Example 1, except that when the acryl-based copolymer was prepared, 2.0 parts by weight of divinylbenzene (DVB) was added instead of 0.001 parts by weight.

Experimental Example

Experimental Example 1

The Mooney viscosity, crosslinking density, oil resistance, and compression set of the acryl-based copolymer composition prepared in the Examples and Comparative Examples were measured in the following methods, and the results thereof are shown in Tables 1 and 2 below.

Mooney viscosity (ML1=4, 100° C.): The Mooney viscosity was measured with a large rotor at a rotor speed of 2±0.02 rpm at 100° C. using a MV-2000 (manufactured by ALPHA Technologies). Here, after the used samples were left standing at room temperature (23±3° C.) for 30 minutes or more, 27±3 g of each sample was taken and filled it into a die cavity, a platen was operated for 4 minutes to measure the Mooney viscosity.

Crosslinking density (Torque (dNm)): The crosslinking density was evaluated through a difference between an initial torque value (ML) and a final torque value (MH) obtained by crosslinking a copolymer subjected to a roll milling process following blending at 180° C. for 30 minutes through a moving die rheometer (MDR).

Oil resistance test: For this specimen, a sheet-type acrylic rubber crosslinked product was obtained, and a dumbbell-type specimen was prepared from the obtained sheet-type acrylic rubber crosslinked product according to ASTM-412D.

This specimen was put in 500 ml of a test liquid and installed so as to be completely immersed in the liquid. This specimen was put in an oven and heated at 155° C. for 168 hours. Meanwhile, 5W-30 oil was used as the test liquid.

After heating, the test specimen was removed from the oven and the test liquid was wiped off. Thereafter, the volume was measured to calculate a change rate $\Delta V$ (%) in volume from an initial volume. The smaller the change rate in volume, the better the oil resistance.

Compression set (%): The compression set (c-set) was measured under 25% compression conditions at 155° C. for 22 hours according to ASTM D395 method B. The compression set was calculated using the following Equation:

Compression set=$(T1-T2)/(T1-T0)*100\%$ wherein T0 is an interval distance of devices, T1 is a thickness of the sample before testing, and T2 is a thickness of the sample after testing.

TABLE 1

| Classification | | Examples |  |  |  |  |  |  |  |
|---|---|---|---|---|---|---|---|---|---|
| | | 1 | 2 | 3 | 4 | 5 | 6 | 7 | 8 |
| Polyfunctional monomer (parts by weight) | DVB | 0.001 | — | 0.005 | 0.01 | — | — | 0.06 | 1.0 |
| | AMA | — | 0.001 | — | — | 0.05 | 0.1 | — | — |
| Mooney viscosity (ML1 + 4, 100° C.) | | 42.5 | 42.1 | 41.8 | 42.5 | 42.1 | 42.7 | 42.8 | 42.6 |
| Crosslinking density (dNm) | ML | 2.89 | 3.04 | 3.12 | 3.18 | 3.21 | 3.41 | 3.31 | 4.10 |
| | MH | 16.34 | 16.47 | 16.53 | 16.29 | 16.35 | 16.25 | 16.16 | 16.69 |
| | MH − ML | 13.45 | 13.43 | 13.41 | 13.11 | 13.14 | 12.84 | 12.85 | 12.59 |
| Oil resistance test ($\Delta V$(%)) | | 3.05 | 2.97 | 2.73 | 2.51 | 2.39 | 2.85 | 3.15 | 3.51 |
| Compression set (%) | | 23.5 | 23.8 | 23.2 | 22.8 | 22.2 | 24.1 | 24.5 | 24.8 |

TABLE 2

| Classification | | Comparative Examples | | |
|---|---|---|---|---|
| | | 1 | 2 | 3 |
| Polyfunctional monomer (parts by weight) | DVB | — | 0.00001 | 2.0 |
| | AMA | — | — | — |
| Mooney viscosity (ML1 + 4, 100° C.) | | 42.3 | 42.7 | not measurable |
| Crosslinking density (dNm) | ML | 2.88 | 2.75 | not measurable |
| | MH | 15.11 | 15.05 | not measurable |
| | MH − ML | 12.23 | 12.30 | not measurable |
| Oil resistance test ($\Delta V$(%)) | | 4.11 | 4.09 | not measurable |
| Compression set (%) | | 26.5 | 26.8 | not measurable |

It can be confirmed from Table 1 that in Examples 1 to including the polyfunctional monomer-derived moiety according to the present invention in an appropriate range, the crosslinking density was improved, such that the oil resistance and compression set were excellent.

On the other hand, it can be confirmed that in Comparative Example 1 not including the polyfunctional monomer-derived moiety according to the present invention, the crosslinking density was decreased as compared with the Examples, and accordingly, the oil resistance and compression set properties were simultaneously decreased.

In addition, in Comparative Example 2 whose used content is less than the appropriate range even if the multifunctional monomer-derived moiety according to the present invention is included, as in Comparative Example 1, an effect of improving the oil resistance and compression set properties was insignificant, so the improvement in the effect that can be confirmed in the Examples could not be expected. In Comparative Example 3 whose used content is greater than the appropriate range, on the contrary, the polyfunctional monomer was included in an excessive amount, such that the rubber has lost its elasticity. Thus, it was impossible to measure physical properties.

Thus, according to the present invention, it was confirmed that it is possible to provide the acryl-based copolymer having excellent oil resistance and compression set due to an improvement of the crosslinking density between the monomers.

The invention claimed is:

1. An acryl-based copolymer, consisting of a main monomer-derived repeating unit and a polyfunctional monomer-derived moiety,
   wherein the main monomer-derived repeating unit consists of a (meth)acrylic acid alkyl ester monomer-derived repeating unit, a (meth)acrylic acid alkoxy alkyl ester monomer-derived repeating unit, and a crosslinkable monomer-derived repeating unit, wherein the (meth)acrylic acid alkyl ester monomer-derived repeating unit is included in an amount of 82% by weight, the (meth)acrylic acid alkoxy alkyl ester monomer-derived repeating unit is included in an amount of 15% by weight, and the crosslinkable monomer-derived repeating unit is included in an amount of 3% by weight based on 100 parts by weight of main monomer mixture,
   wherein the polyfunctional monomer of the polyfunctional monomer-derived moiety; includes a vinyl group or an allyl group,
   wherein the polyfunctional monomer-derived moiety is included in an amount of 0.001 to 0.05 part by weight based on 100 parts by weight of a total main monomer-derived repeating unit, wherein the (meth)acrylic acid alkoxy alkyl ester monomer-derived repeating unit is one or more selected from the group consisting of methoxymethyl (meth)acrylate, ethoxyethyl (meth)acrylate, 2-ethoxyethyl (meth)acrylate, 2-butoxyethyl (meth)acrylate, 2-methoxyethyl (meth)acrylate, 2-propoxyethyl (meth)acrylate, 3-methoxypropyl (meth)acrylate, and 4-methoxybutyl (meth)acrylate, wherein the (meth)acrylic acid alkyl ester monomer-derived repeating unit is one or more selected from the group consisting of methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, and cyclohexyl (meth)acrylate, wherein the crosslinkable monomer of the crosslinkable monomer-derived repeating unit is one or more selected from the group consisting of vinyl chloroacetate, vinyl benzyl chloride, 2-chloro ethyl acrylate, and 2-chloroethyl vinyl ether, and wherein the polyfunctional monomer is divinylbenzene or allyl methacrylate.

2. The acryl-based copolymer of claim 1, wherein a Mooney viscosity (ML1+4, 100° C.) of the acryl-based copolymer is 10 to 70.

3. A method of preparing the acryl-based copolymer of claim 1, the method comprising:

preparing a main monomer mixture consisting of a (meth) acrylic alkyl ester monomer in an amount of 82% by weight, a (meth) acrylic acid alkoxy alkyl ester monomer in an amount of 15% by weight, and a crosslinkable monomer in an amount of 3% by weight based on 100 parts by weight of main monomer mixture, and adding a polyfunctional monomer to the main monomer mixture and polymerizing the mixture, wherein the polyfunctional monomer is added in an amount of 0.001 to 0.05 part by weight based on 100 parts by weight of a total main monomer mixture, and wherein the (meth)acrylic acid alkoxy alkyl ester monomer is one or more selected from the group consisting of methoxymethyl (meth)acrylate, ethoxyethyl (meth)acrylate, 2-ethoxyethyl (meth)acrylate, 2-butoxyethyl (meth)acrylate, 2-methoxyethyl (meth)acrylate, 2-propoxyethyl (meth)acrylate, 3-methoxypropyl (meth)acrylate, and 4-methoxybutyl (meth)acrylate, wherein the (meth)acrylic acid alkyl ester monomer-derived repeating unit is one or more selected from the group consisting of methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, and cyclohexyl (methacrylate, wherein the crosslinkable monomer of the crosslinkable monomer-derived repeating unit is one or more selected from the group consisting of vinyl chloroacetate, vinyl benzyl chloride, 2-chloroethyl acrylate, and 2-chloroethyl vinyl ether and wherein the polyfunctional monomer is divinylbenzene or allyl methacrylate.

4. An acryl-based copolymer composition, comprising the acryl-based copolymer of claim 1 and a filler.

* * * * *